(12) United States Patent
Horde et al.

(10) Patent No.: US 11,661,203 B2
(45) Date of Patent: May 30, 2023

(54) AIRCRAFT PYLON COMPRISING A TUBULAR PRIMARY STRUCTURE INCLUDING AT LEAST ONE TWIN-WALLED PIPE, AND AIRCRAFT COMPRISING AT LEAST ONE SUCH PYLON

(71) Applicant: Airbus Operations SAS, Toulouse (FR)

(72) Inventors: Theophile Horde, Toulouse (FR); Lionel Czapla, Toulouse (FR); Christophe Labarthe, Toulouse (FR)

(73) Assignee: AIRBUS OPERATIONS SAS, Toulouse (FR)

(*) Notice: Subject to any disclaimer, the term of this patent is extended or adjusted under 35 U.S.C. 154(b) by 0 days.

(21) Appl. No.: 17/685,608

(22) Filed: Mar. 3, 2022

(65) Prior Publication Data
US 2022/0289396 A1 Sep. 15, 2022

(30) Foreign Application Priority Data
Mar. 11, 2021 (FR) ...................................... 2102383

(51) Int. Cl.
*B64D 27/26* (2006.01)
*B64D 29/00* (2006.01)

(52) U.S. Cl.
CPC ............. *B64D 27/26* (2013.01); *B64D 29/00* (2013.01)

(58) Field of Classification Search
CPC ........ B64D 27/26; B64D 29/00; B64D 37/30; B64D 2027/266; B64C 3/32
See application file for complete search history.

(56) References Cited

U.S. PATENT DOCUMENTS

| | | | | |
|---|---|---|---|---|
| 3,633,847 A * | 1/1972 | Fricke | ................. | B64C 29/0033 244/12.4 |
| 4,044,973 A * | 8/1977 | Moorehead | ............ | B64D 27/26 244/54 |
| 5,351,727 A * | 10/1994 | Sanders | .................. | F16L 39/04 285/123.17 |
| 5,524,847 A * | 6/1996 | Brodell | ..................... | B64C 7/02 60/797 |
| 6,802,479 B2 * | 10/2004 | Howe | .................... | B64D 37/00 244/129.1 |
| 7,121,504 B2 * | 10/2006 | Machado | ............... | B64D 27/12 244/54 |
| 8,172,272 B2 * | 5/2012 | Petit | ..................... | F16L 39/005 285/302 |
| 8,727,269 B2 * | 5/2014 | Stuart | .................... | B64D 27/26 60/797 |

(Continued)

OTHER PUBLICATIONS

French Search Report; priority document.

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An aircraft pylon comprising a primary structure and a pipe segment having an internal duct positioned inside at least one structural tube primary structure. This solution makes it possible to reduce the crowding outside the structural tubes of the primary structure, makes it easier to integrate other equipment inside the pylon, and may help to improve the aerodynamic performance of the pylon by reducing its cross section.

6 Claims, 10 Drawing Sheets

(56) References Cited

U.S. PATENT DOCUMENTS

| | | | | |
|---|---|---|---|---|
| 2006/0038065 | A1* | 2/2006 | Howe | B64D 27/26 244/54 |
| 2012/0104162 | A1* | 5/2012 | West | B64D 27/18 244/54 |
| 2015/0121838 | A1* | 5/2015 | Suciu | B64D 29/06 60/39.15 |
| 2015/0219048 | A1* | 8/2015 | Fraysse | F16L 39/00 285/123.15 |
| 2016/0052637 | A1* | 2/2016 | Mauldin | B64D 27/26 244/54 |
| 2016/0229545 | A1* | 8/2016 | Pautis | B64D 27/26 |
| 2018/0334259 | A1* | 11/2018 | Aten | B64D 27/18 |
| 2019/0100324 | A1* | 4/2019 | Journade | B64D 27/26 |

\* cited by examiner

AIRCRAFT PYLON COMPRISING A TUBULAR PRIMARY STRUCTURE INCLUDING AT LEAST ONE TWIN-WALLED PIPE, AND AIRCRAFT COMPRISING AT LEAST ONE SUCH PYLON

CROSS-REFERENCES TO RELATED APPLICATIONS

This application claims the benefit of the French patent application No. 2102383 filed on Mar. 11, 2021, the entire disclosures of which are incorporated herein by way of reference.

FIELD OF THE INVENTION

The present application relates to an aircraft pylon comprising a tubular primary structure that includes at least one twin-walled pipe, and to an aircraft comprising at least one such pylon.

BACKGROUND OF THE INVENTION

Figure 1:
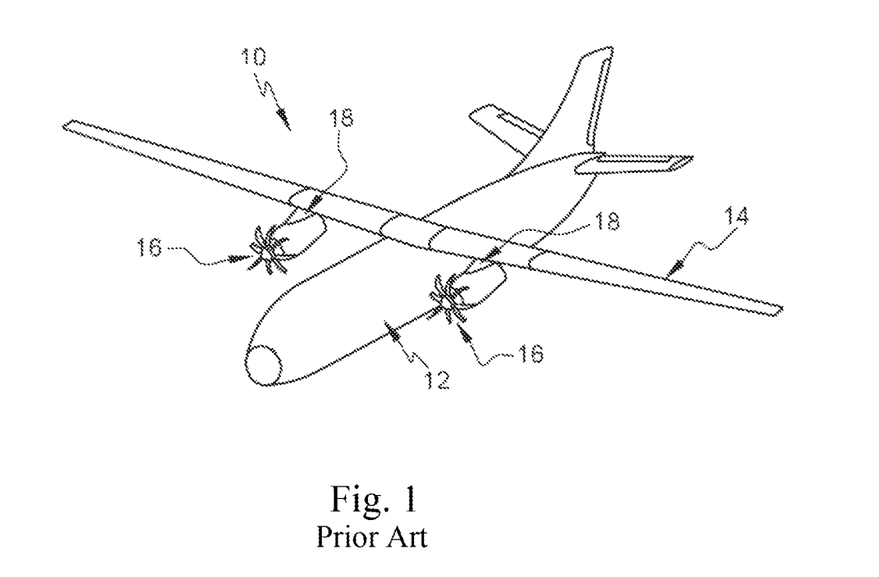
FIG. 1 is a schematic depiction of an aircraft.

According to one embodiment, shown in FIG. 1, an aircraft 10 comprises a fuselage 12, at least one wing 14 connected to the fuselage 12, and propulsion units 16 positioned beneath the wings 14.

Each propulsion unit 16 is connected to the wing 14 by a pylon 18 which comprises a primary structure which serves, among other things, to react the forces between the propulsion unit 16 and the wing 14, and a secondary structure forming an outer aerodynamic fairing in which the primary structure is positioned.

According to one embodiment, the primary structure is a box-type structure delimited by upper and lower lateral panels inside which are housed numerous elements connecting each propulsion unit to the rest of the aircraft, such as a fuel pipe.

In the case of a propulsion unit running on hydrogen, the pipes must be twin-walled pipes and comprise an internal duct in which the hydrogen flows, and an external duct inside which the internal duct is positioned substantially coaxially. A pipe of this kind is relatively bulky, which makes it difficult to integrate into the pylon and also tends to increase the cross section of the pylon and hence to reduce the aerodynamic performance of the aircraft.

The present invention aims to remedy all of part of the drawbacks of the prior art.

SUMMARY OF THE INVENTION

To that end, the invention relates to an aircraft pylon comprising a primary structure comprising structural tubes and a pipe segment having an internal duct, each structural tube comprising a tubular wall that separates an interior zone from an exterior zone.

According to the invention, the internal duct of the pipe segment is positioned in the interior zone of at least one of the structural tubes of the primary structure.

This solution makes it possible to reduce the crowding outside the structural tubes of the primary structure, makes it easier to integrate other equipment inside the pylon, and may help to improve the aerodynamic performance of the pylon by reducing its cross section.

According to another feature, the primary structure comprises at least one first or second passage hole passing through at least one of the tubular walls of the structural tubes of the primary structure, the first or second passage hole being configured to allow the internal duct to pass therethrough.

According to another feature, the primary structure comprises a first passage hole for the internal duct to pass into the interior zone of at least one of the structural tubes of the primary structure, and a second passage hole for the internal duct to pass out of the interior zone.

According to another feature, the pylon comprises an upstream and/or downstream pipe segment comprising an external duct which forms, with the internal duct, a twin-walled pipe, the external duct comprising an end oriented towards one of the structural tubes of the primary structure. In addition, the pylon comprises a leaktight connection connecting the end of the external duct and one of the structural tubes of the primary structure.

According to another feature, the connection comprises:
an end wall fitted to the end of the external duct and held clamped against the tubular wall of the structural tube all around the first or second passage hole, this end wall having a passage orifice through which the internal duct passes,
a tubular extension that prolongs the passage orifice and is push-fitted into the first or second passage hole,
at least one first seal, surrounding the first or second passage hole, interposed between the end wall and the tubular wall (P30, P34) of the structural tube,
at least one second seal interposed between the internal duct and the tubular extension.

According to another feature, the pylon comprises a sealing system between the internal duct and the tubular wall of the structural tube at the first or second passage hole. This sealing system comprises a collar that is secured to the internal duct and positioned outside the structural tube and held clamped against the tubular wall of the structural tube all around the first or second passage hole, and at least one seal which surrounds the first or second passage hole and is interposed between the collar and the tubular wall of the structural tube.

According to another feature, the pylon comprises at least two internal duct segments, a connector connecting the two internal duct segments, first and second structural tube segments and a connection system connecting the first and second structural tube segments, the connector and the connection system being positioned approximately in a shared plane. This connection system comprises two ends of the first and second structural tube segments push-fitted one inside the other, a system for holding the two ends push-fitted one inside the other and at least one seal interposed between the two ends push-fitted one inside the other.

According to another feature, the primary structure comprises a transverse frame comprising an orifice in which are positioned the connector and the connection system. In addition, the holding system comprises a first collar secured to the first structural tube segment and held clamped against a first face of the transverse frame, a second collar secured to the second structural tube segment and held clamped against a second face of the transverse frame, and sealing elements interposed between each of the first and second collars and the transverse frame.

According to another feature, the primary structure comprises at least one partition which is positioned inside one of the structural tubes and is connected in a leaktight manner to the tubular wall so as to delimit, in the interior zone, a leaktight cavity in which the internal duct is positioned.

According to another feature, the primary structure comprises at least one spacer that is configured to keep separate the internal duct and the tubular wall of the structural tube.

The invention also relates to an aircraft comprising at least one pylon according to one of the preceding features.

BRIEF DESCRIPTION OF THE DRAWINGS

Other features and advantages will emerge upon reading the following purely exemplary description of the invention, with reference to the appended drawings, in which.

DETAILED DESCRIPTION OF THE PREFERRED EMBODIMENTS

Figure 2:
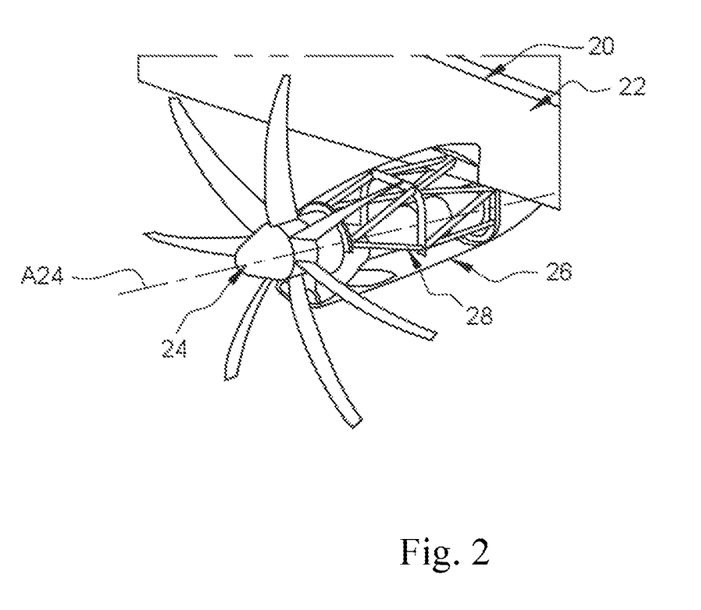
FIG. 2 is a perspective view of a propulsion unit and a pylon of an aircraft, the secondary structure of the pylon being transparent.

As shown in FIG. 2, an aircraft 20 comprises at least one wing 22, at least one engine 24 having a propeller, and at least one pylon 26 connecting the engine 24 to the wing 22.

For the remainder of the description, the longitudinal direction is parallel to the engine axis A24. A transverse plane is perpendicular to the longitudinal direction or to the engine axis A24.

The pylon 26 comprises a primary structure 28 and a secondary structure, forming an aerodynamic fairing around the primary structure 28. The primary structure comprises an engine mount 28.1 for connecting it to the engine 24 and a wing mount 28.2 for connecting it to the wing 22.

Figure 3:
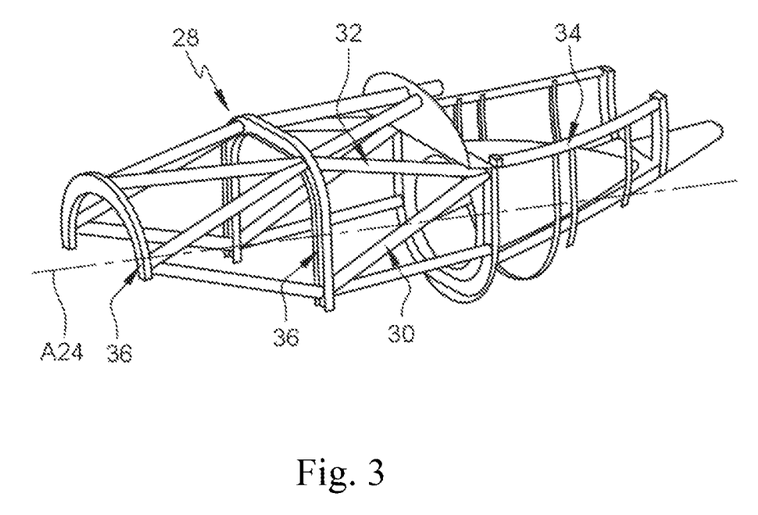
FIG. 3 is a perspective view of a tubular primary structure of an aircraft pylon, illustrating one embodiment of the invention.

The primary structure 28 is a tubular structure and comprises a plurality of structural tubes 30, 32, 34.

A structural tube is understood to be a tube that is designed to transmit some of the forces between the engine 24 and the rest of the aircraft 20.

According to one embodiment, the structural tubes 30, 32, 34 are arranged in a truss, and the primary structure 28 comprises hoops 36 positioned in transverse planes and connected to one another by the structural tubes 30, 32, 34.

Each structural tube 30, 32, 34 comprises a tubular wall P30, P32, P34 that separates an interior zone Zi from an exterior zone Ze.

Figure 4:
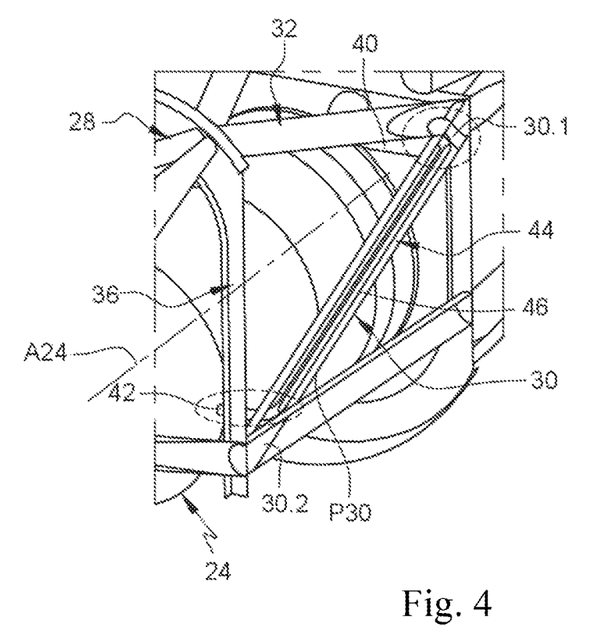
FIG. 4 is a perspective view of part of the primary structure shown in FIG. 3, a partially transparent structural tube, illustrating a first configuration of the invention.
Figure 5:
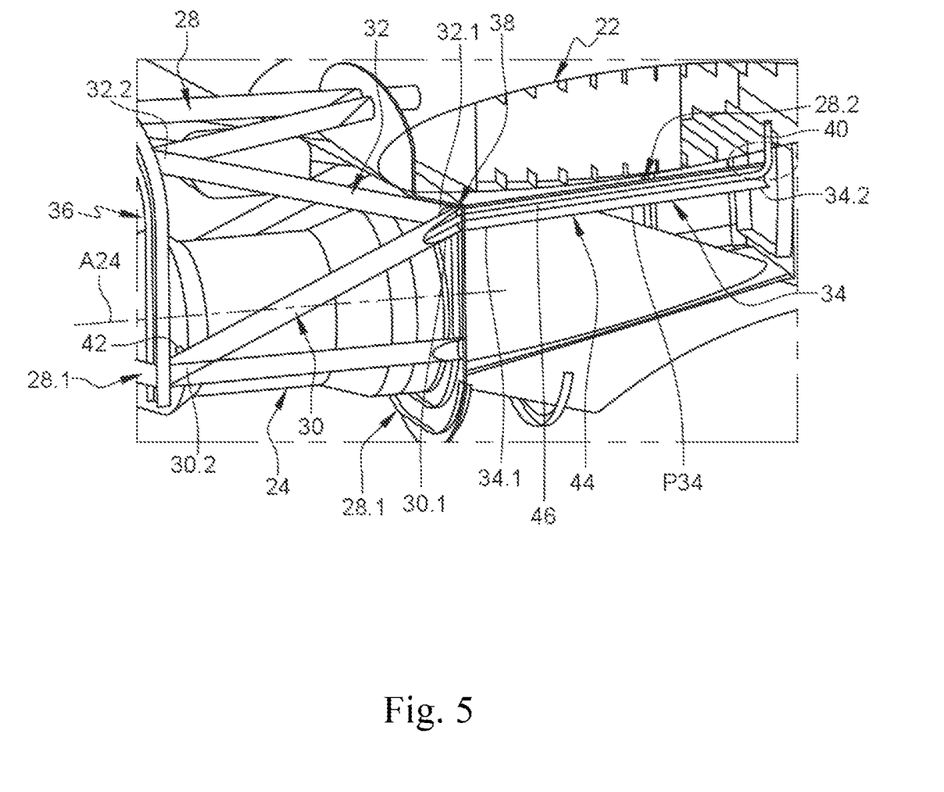
FIG. 5 is a perspective view of part of the primary structure shown in FIG. 3, a partially transparent structural tube, illustrating a second configuration of the invention.

According to one configuration shown in FIGS. 4 and 5, the primary structure 28 comprises:

a first structural tube 30 which extends between a first end 30.1 close to the wing 22 and a second end 30.2 close to the engine 24, a second structural tube 32 which extends between a first end 32.1 connected to the first end 30.1 of the first structural tube 30 and a second end 32.2 remote from the second end 30.2 of the first structural tube 30, a third structural tube 34 which has a first end 34.1 connected the first ends 30.1, 32.1 of the first and second structural tubes 30, 32 and which runs alongside the wing mount 28.2.

Figure 9:
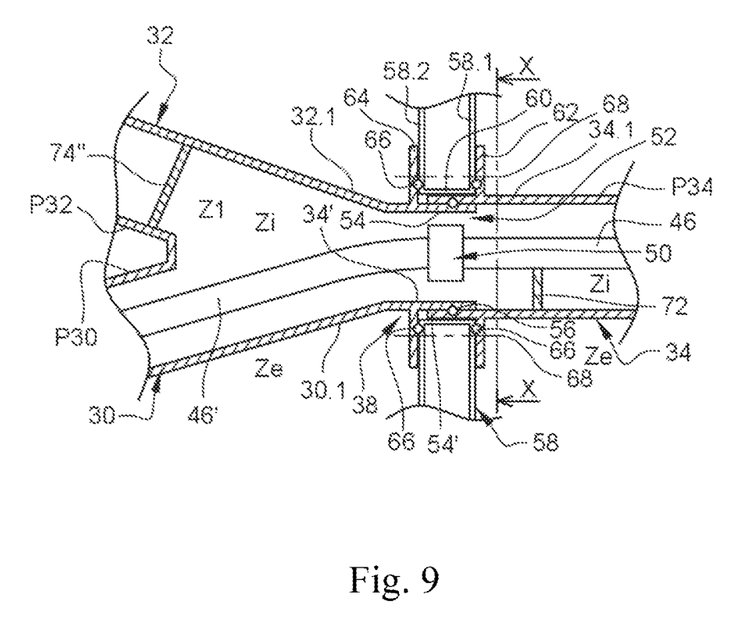
FIG. 9 is a schematic depiction of part of the primary structure shown in FIG. 4.

The first, second and third structural tubes 30, 32, 34 form a Y shape, the third structural tube 34 forming the stem of the Y shape and the first and second structural tubes 30, 32 forming a V shape. According to this configuration, the first, second and third structural tubes 30, 32, 34 are connected at a node 38 corresponding to the first ends 30.1, 32.1, 34.1 of the first, second and third structural tubes 30, 32, 34. At the node 38, the interior zones ZI of the first, second and third structural tubes 30, 32, 34 communicate with one another, as shown in FIG. 9.

The aircraft 20 also comprises at least one reservoir 39 and at least one pipe connecting the reservoir 39 to the engine 24.

According to one configuration, this pipe comprises a first pipe segment 40 upstream of the pylon 26, a second pipe segment 42 downstream of the pylon 26 and a third pipe segment 44 positioned at the pylon 26.

Whatever the configuration, the pylon 26 comprises at least one pipe segment 44.

According to one particular aspect of the invention, the pipe segment 44 comprises an internal duct 46 positioned in the interior zone of at least one structural tube 30, 32, 34 of the primary structure 28. Thus, the internal duct 46 and the structural tube 30, 32, 34 form a twin-walled pipe.

According to one configuration, the internal duct 46 enters the interior zone Zi of the structural tube 30, 32, 34, or exits therefrom, via at least one opening end of the structural tube 30, 32, 34. According to another configuration, the primary structure 28 comprises at least one passage hole 48 that passes through at least one of the tubular walls P30, P32, P34 of the structural tubes 30, 32, 34 of the primary structure 28, the passage hole 48 being configured in such a way that the internal duct 46 can pass through it. According to one embodiment shown in FIGS. 4 to 8, the primary structure 28 comprises a first passage hole 48 that serves for the internal duct 46 to enter the interior zone Zi of at least one of the structural tubes 30, 32, 34 of the primary structure 28, and a second passage hole 48' to allow it to leave the interior zone Zi.

According to a first configuration, shown in FIG. 4, the internal duct 46 follows a path inside the first structural tube 30, between a first passage hole 48 positioned close to the first end 30.1 of the first structural tube 30 and a second passage hole 48' positioned close to the second end 30.2 of the first structural tube 30.

According to a second configuration, shown in FIG. 5, the internal duct 46 follows a path inside the first and third structural tubes 30, 34, between a first passage hole 48 positioned close to the second end 34.2 of the third structural tube 34 and a second passage orifice 48' positioned close to the second end 30.2 of the first structural tube 30.

According to one configuration, the internal duct 46 is configured to convey hydrogen. Depending on circumstances, it may comprise a single segment that extends from the reservoir 39 to the engine 24, or multiple segments that are connected to one another by at least one connector 50, as illustrated in FIG. 9.

According to one embodiment, the pylon comprises at least two internal duct segments 46, 46', with a connector 50 connecting the two internal duct segments 46, 46', two structural tube segments 34, 34' and a connection system 52 connecting the two structural tube segments 34, 34', the connector 50 and the connection system 52 being positioned approximately in a shared plane.

According to one configuration, shown in FIG. 9, the first structural tube segment 34 corresponds to the third structural tube 34. The second structural tube segment 34' extends the first ends 30.1, 32.1 of the first and second structural tubes 30, 32 so as to obtain a Y shape.

As illustrated in FIG. 9, the connection system 52 comprises two ends 54, 54' of the structural tube segments 34, 34', these ends being push-fitted one inside the other, a system for holding the two ends 54, 54' of the structural tube segments 34, 34' push-fitted one inside the other, and at least one seal 56 interposed between the two ends 54, 54' of the structural tube segments 34, 34' push-fitted one inside the other.

According to this embodiment, the connector 50 connecting the two internal duct segments 46, 46' is a quick connector that serves to establish a connection without the need for tools.

This arrangement makes it possible to obtain a removable connection for the pipe segment 44 at the pylon 26, which makes it easier to install and remove the engine 24.

Figure 10:
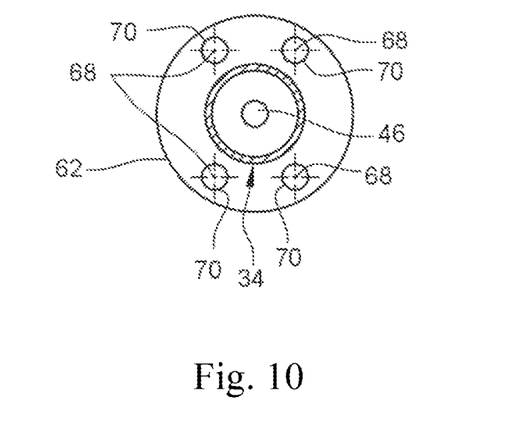
FIG. 10 is a cross section along the line X-X in FIG. 9.

According to one configuration, the primary structure 28 comprises a transverse frame 58 which has an orifice 60 in which the connector 50 and the connection system 52 are positioned. In addition, the holding system comprises a first collar 62 that is secured to the first structural tube segment 34 and is held clamped against a first face 58.1 of the transverse frame 58, a second collar 64 that is secured to the second structural tube segment 34' and is held clamped against a second face 58.2 (opposite the first face 58.1) of the transverse frame 58, and sealing elements 66 interposed between each of the first and second collars 62, 64 and the transverse frame 58.

The connection system 52 comprises fasteners 68 for connecting the first and second collars 62 and 64 to the transverse frame 58. To that end, the first and second collars 62, 64 comprise orifices 70 for accommodating the fasteners 68. For at least one of the first and second collars 62, 64, the fasteners 68 and the orifices 70 are configured to allow a slight degree of play in a plane parallel to the first or second face 58.1, 58.2 of the transverse frame 58.

According to one embodiment, the primary structure 28 comprises at least one spacer 72 that is configured to hold the internal duct 46 and the tubular wall P34 of the structural tube 34 apart, as illustrated in FIG. 9.

According to one embodiment, shown in FIGS. 6 to 9, the primary structure 28 comprises at least one partition 74, positioned inside one of the structural tubes 30, 32, 34 and connected in a leaktight manner to the tubular wall P30, P32, P34 in order to delimit, in the interior zone Zi, a leaktight cavity Z1 in which the internal duct 46 is positioned.

According to one configuration, the primary structure 28 comprises a first partition 74 (shown in FIG. 7) positioned in the third structural tube 34, close to the first passage hole 48, a second partition 74' (shown in FIGS. 6 and 8) positioned in the first structural tube 30, close to the second passage hole 48', and a third partition 74" positioned in the second structural tube 32, close to its first end 32.1. These partitions 74, 74', 74" serve to delimit, together with the tubular walls P30, P32, P34, a leaktight cavity Z1.

The cavity Z1, which contains the internal duct 46 and is isolated by at least one partition 74, 74', 74", can be filled with an inert gas or a foam, or can be evacuated.

Figure 6:
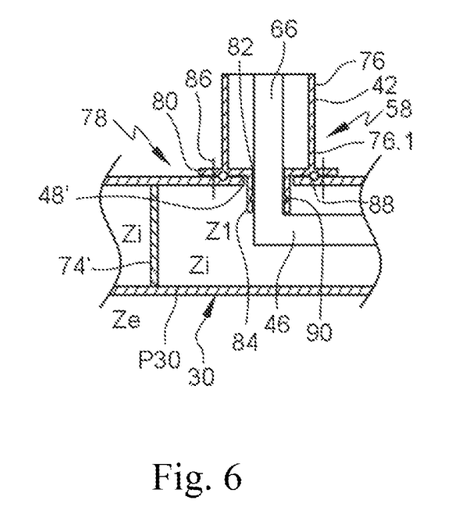
FIG. 6 is a schematic depiction of a connection between the primary structure and a twin-walled pipe, illustrating a first embodiment of the invention.
Figure 7:
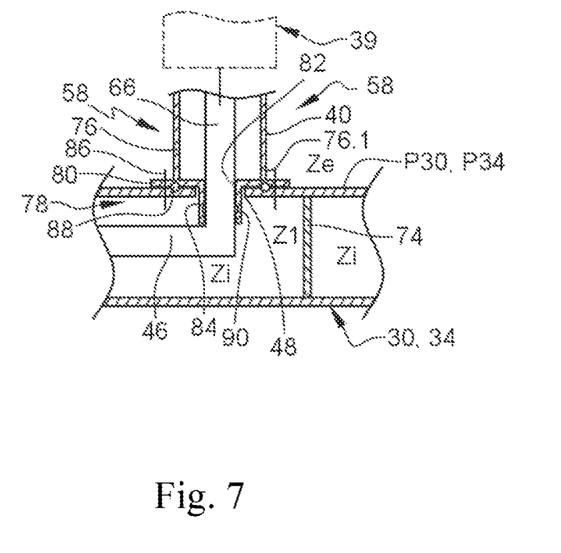
FIG. 7 is a schematic depiction of a connection between the primary structure and a twin-walled pipe, illustrating a second embodiment of the invention.

According to one configuration, shown in FIGS. 6 and 7, the upstream and/or downstream pipe segment 40, 42 comprises an external duct 76 to form, with the internal duct 46, a twin-walled pipe. Each external duct 76 comprises an end 76.1 connected by a leaktight connection 78 to one of the structural tubes 30, 34 of the primary structure 28.

According to embodiments shown in FIGS. 6 and 7, this connection 78 comprises an end wall 80 attached to the end 76.1 of the external duct 76 and held clamped against the tubular wall P30, P34 of the structural tube 30, 34 all around the first or second passage hole 48, 48'. This end wall 80 comprises a passage orifice 82 through which the internal duct 46 passes.

The connection 78 comprises a tubular extension 84 that extends the passage orifice 82 and is push-fitted into the first or second passage hole 48, 48'. This tubular extension 84 has an internal diameter that is substantially equal to or slightly greater than the external diameter of the internal duct 46. The connection 78 comprises fasteners 86 connecting the end wall 80 to the tubular wall P30, P34 of the structural tube 30, 34, at least one first seal 88 that surrounds the first or second passage hole 48, 48' and is interposed between the end wall 80 and the tubular wall P30, P34 of the structural tube 30, 34, and at least one second seal 90 interposed between the internal duct 46 and the tubular extension 84.

Figure 8:
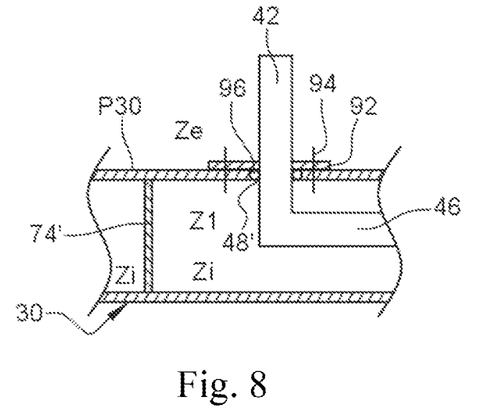
FIG. 8 is a schematic depiction of a connection between the primary structure and a twin-walled pipe, illustrating a third embodiment of the invention.

According to one configuration, shown in FIG. 8, the upstream or downstream pipe segment 40, 42 of the pipe does not comprise an external duct. In this case, the pylon comprises a sealing system between the internal duct 46 and the tubular wall P30, P34 of the structural tube 30, 34 at the first or second passage hole 48, 48'. This sealing system comprises a collar 92 that is secured to the internal duct 46 and positioned outside the structural tube 30, 34 and held clamped against the tubular wall P30, P34 of the structural tube 30, 34 all around the first or second passage hole 48, 48', and at least one seal 96 surrounding the first or second passage hole 48, 48', interposed between the collar 92 and the tubular wall P30, P34 of the structural tube 30, 34. The sealing system also comprises fasteners 94 that serve to connect the collar 92 and the tubular wall P30, P34 of the structural tube 30, 34.

The invention is not restricted to the embodiments described in relation to the engine 24, the manner of fastening the engine 24 and the fluid flowing in the pipe. In other words, the engine 24 might not have a propeller and might be connected to a different part of the aircraft 20, such as a fuselage. Furthermore, the invention is not restricted to hydrogen and may be suitable for any type of fluid.

Whatever the embodiment, at least one structural tube 30, 32, 34 of the primary structure 28 is used as an external duct of a pipe. This solution makes it possible to integrate at least one duct inside at least one structural tube, which serves to reduce the crowding outside the structural tubes of the primary structure, makes it easier to integrate other equipment inside the pylon, and may help to improve the aerodynamic performance of the pylon by reducing its cross section.

Furthermore, the fact that a single element acts both as a structural tube and as an external duct of a pipe helps to reduce the on-board mass.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft pylon comprising:
    a primary structure comprising structural tubes and a pipe segment having an internal duct, each structural tube comprising a tubular wall that separates an interior zone from an exterior zone,
    wherein the internal duct of the pipe segment is positioned in the interior zone of at least one of the structural tubes of the primary structure,
    wherein the primary structure comprises at least one first or second passage hole passing through at least one of the tubular walls of the structural tubes of the primary structure, the first or second passage hole being configured to allow the internal duct to pass therethrough,
    wherein the pylon comprises at least one of an upstream or downstream pipe segment comprising an external duct which forms, with the internal duct, a twin-walled pipe, the external duct comprising an end oriented towards one of the structural tubes of the primary structure,
    wherein the pylon comprises a leaktight connection connecting the end of the external duct and one of the structural tubes of the primary structure,
    wherein the leaktight connection comprises:
        an end wall fitted to the end of the external duct and held clamped against the tubular wall of the structural tube all around the first or second passage hole, said end wall having a passage orifice through which the internal duct passes,
        a tubular extension that prolongs the passage orifice and is push-fitted into the first or second passage hole,
        at least one first seal, surrounding the first or second passage hole, interposed between the end wall and the tubular wall of the structural tube,
        at least one second seal interposed between the internal duct and the tubular extension.

2. The aircraft pylon according to claim 1, wherein the pylon comprises at least two internal duct segments, a connector connecting the two internal duct segments, first and second structural tube segments and a connection system connecting the first and second structural tube segments, the connector and the connection system being positioned approximately in a shared plane, and in that the connection system comprises two ends of the first and second structural tube segments push-fitted one inside the other, a holding system for holding the two ends push-fitted one inside the other and at least one seal interposed between the two ends push-fitted one inside the other.

3. The aircraft pylon according to claim 2,
    wherein the primary structure comprises a transverse frame comprising an orifice in which are positioned the connector and the connection system, and
    wherein the holding system comprises
        a first collar secured to the first structural tube segment and held clamped against a first face of the transverse frame,
        a second collar secured to the second structural tube segment and held clamped against a second face of the transverse frame, and
        sealing elements interposed between each of the first and second collars and the transverse frame.

4. The aircraft pylon according to claim 1, wherein the primary structure comprises at least one partition which is positioned inside one of the structural tubes and is connected in a leaktight manner to the tubular wall so as to delimit, in the interior zone, a leaktight cavity in which the internal duct is positioned.

5. The aircraft pylon according to claim 1, wherein the primary structure comprises at least one spacer configured to keep separate the internal duct and the tubular wall of the structural tube.

6. An aircraft comprising at least one pylon according to claim 1.

* * * * *